(12) United States Patent
Isaksson et al.

(10) Patent No.: US 11,404,888 B2
(45) Date of Patent: Aug. 2, 2022

(54) ELECTRICAL BATTERY SYSTEM

(71) Applicant: Ningbo Geely Automobile Research & Development Co., Ltd., Ningbo (CN)

(72) Inventors: Björn Isaksson, Uddevalla (SE); Linus Hallberg, Säve (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 156 days.

(21) Appl. No.: 16/994,608

(22) Filed: Aug. 16, 2020

(65) Prior Publication Data
US 2020/0381928 A1    Dec. 3, 2020

Related U.S. Application Data

(63) Continuation of application No. PCT/CN2019/074985, filed on Feb. 13, 2019.

(30) Foreign Application Priority Data

Feb. 23, 2018 (EP) ..................... 18158429

(51) Int. Cl.
*H02J 7/00* (2006.01)
*B60L 53/22* (2019.01)
*B60L 50/60* (2019.01)

(52) U.S. Cl.
CPC ............ *H02J 7/0025* (2020.01); *B60L 50/66* (2019.02); *B60L 53/22* (2019.02); *H02J 7/0024* (2013.01);
(Continued)

(58) Field of Classification Search
CPC .... H02J 7/0025; H02J 7/0024; H02J 7/00711; B60L 50/66; B60L 53/22; B60L 2210/12;
(Continued)

(56) References Cited

U.S. PATENT DOCUMENTS 7,734,317 B2 * 6/2010 Patel ..................... H02J 7/0025
320/129
8,704,485 B1 * 4/2014 Tsukamoto ............. B60L 50/66
320/112
(Continued)

FOREIGN PATENT DOCUMENTS

CN     102555765 A    7/2012
WO   2012146963 A2   11/2012

OTHER PUBLICATIONS

International Search Report (ISR) from corresponding International Patent Application No. PCT/CN2019/074985, dated May 17, 2019, 2 pages.
(Continued)

*Primary Examiner* — Paul Dinh
(74) *Attorney, Agent, or Firm* — Tucker Ellis LLP

(57) ABSTRACT

An electrical battery system for a vehicle includes a first battery pack and a second battery pack. The first battery pack has a larger total nominal energy capacity than the second battery pack. The first battery pack includes an array of a first type of battery cells and the second battery pack includes an array of a second type of battery cells. The second type of battery cells withstands a larger maximal 30-seconds discharge pulse current than the first type of battery cells. The first type of battery cells have a higher nominal energy capacity per unit volume than the second type of battery cells, and the battery cells of the second battery pack are better thermally insulated than the battery cells of the first battery pack. Additionally, a vehicle drive train includes such an electrical battery system or a vehicle includes such an electrical battery system.

13 Claims, 6 Drawing Sheets

(52) U.S. Cl.
CPC ....... *H02J 7/00711* (2020.01); *B60L 2210/12* (2013.01); *B60L 2210/14* (2013.01)

(58) Field of Classification Search
CPC ...... B60L 2210/14; B60L 58/20; B60L 58/24; B60L 50/50; Y02E 60/10; Y02T 10/70; Y02T 10/7072; Y02T 90/14; Y02T 90/40; H01M 2220/20; H01M 10/441; H01M 10/443; H01M 10/486; H01M 10/625; H01M 10/658; H01M 50/20; H01M 50/24
USPC ........................................................ 320/112
See application file for complete search history.

(56) References Cited

U.S. PATENT DOCUMENTS

| | | |
|---|---|---|
| 2004/0017175 A1 | 1/2004 | Lee |
| 2010/0009219 A1 | 1/2010 | Kwon |
| 2014/0285135 A1 | 9/2014 | Yan |
| 2015/0050527 A1 | 2/2015 | Jiang |
| 2015/0266386 A1 | 9/2015 | Yoshimoto |
| 2016/0023571 A1 | 1/2016 | Yang |
| 2016/0200214 A1 | 7/2016 | Ishibashi |
| 2017/0256833 A1 | 9/2017 | Ciaccio |
| 2020/0406766 A1* | 12/2020 | Liu .......................... B60L 53/14 |

OTHER PUBLICATIONS

European Search Report from corresponding European Patent Application No. 18158429, dated Aug. 9, 2018, 2 pages.

* cited by examiner

ELECTRICAL BATTERY SYSTEM

RELATED APPLICATION DATA

This application is a continuation of International Patent Application No. PCT/CN2019/074985, filed Feb. 13, 2019, which claims the benefit of European Patent Application No. 18158429.3, filed Feb. 23, 2018, the disclosures of which are incorporated herein by reference in their entireties.

TECHNICAL FIELD

The disclosure relates to an electrical battery system for a vehicle comprising a first battery pack and a second battery pack. The disclosure also relates to a vehicle drive train comprising such an electrical battery system, as well as a vehicle comprising such an electrical battery system. Furthermore, the disclosure relates to a method for controlling operation of a vehicle drive train comprising such an electrical battery system.

Although the disclosure will be primarily described in relation to a car, the disclosure is not restricted to this particular vehicle, but may alternatively be installed in other type of vehicles, such as for example buses, trucks, working machines, off-road vehicles, rail vehicles, flying vehicles, marine vessels, motorcycles, rollers, bikes, or the like.

BACKGROUND ART

In the field electrically propelled vehicles, such as for example hybrid electric vehicles and battery electric vehicles, the performance, cost, weight, packaging volume and lifetime are all relevant parameters of the electrical battery system for providing an attractive and competitive product to the consumers. However, these parameters are not easily combined because they sometimes have contradictory effects.

For example, a relatively high performance electrical battery system in terms of energy capacity typically requires a large number of battery cells, thereby making it relatively large, heavy and costly. Similarly, relatively high peak-acceleration and peak-regeneration typically results in reduced battery cell durability and lifetime.

Despite the activities in the field, there is a demand for an electrical battery system with improved performance, lower cost, lower weight, reduced volume and improved lifetime.

SUMMARY OF THE DISCLOSURE

A general object of the present disclosure is to provide an electrical battery system for a vehicle that provides improved performance, lower cost, lower weight, reduced volume and improved lifetime.

This and other objects, which will become apparent in the following, are at least partly accomplished by an electrical battery system as defined in the accompanying independent claims. Details of some example embodiments and further optional features are recited in the associated dependent claims.

According to a first aspect of the present disclosure, there is provided an electrical battery system for a vehicle comprising a first battery pack and a second battery pack. The first battery pack has a larger total nominal energy capacity (Watthour [Wh]) than the second battery pack. The first battery pack comprises an array of a first type of battery cells and the second battery pack comprises an array of a second type of battery cells. The second type of battery cells withstands a larger maximal 30-seconds discharge pulse current than the first type of battery cells. The first type of battery cells has a higher nominal energy capacity per unit volume [Wh/litre] than the second type of battery cells. Finally, the battery cells of the second battery pack are better thermally insulated than the battery cells of the first battery pack.

One approach for accomplishing a better overall performance of an electrical battery system in terms of a range of different relevant electrical battery system parameters is to divide the electrical battery system into different sections or packages that are designed to meet specific individual requirements, while taking less account of other requirements. Thereby, the design trade-offs that otherwise have to be made when designing a complete electrical battery system comprising a single section of battery cells of the same type can be at least partly overcome.

In particular, by having the battery cells of the second battery pack better thermally insulated than the battery cells of the first battery pack, sufficient performance of the electrical battery system is secured during cold start of the vehicle, even at very low ambient temperatures, without having to waste large amount of energy on battery cell heating prior to the cold start. And by having the battery cells of the first battery pack less thermally insulated than the battery cells of the second battery pack the total volume of the electrical battery system can be kept small compared with if a single insulated battery pack was used.

Moreover, by providing the second battery pack with a smaller total nominal energy capacity [Wh] than the first battery pack, the volume of the battery cells of the second battery pack is kept relatively small. Thereby, only a relatively small part of the total electrical battery system may be provided with a relatively thick insulation, such that the total volume of the electrical battery system is kept relatively small.

For even further reducing the volume of the battery cells of the second battery pack that are better insulated the battery cells of the second battery pack are designed to withstand a larger maximal 30-seconds discharge pulse current than the battery cells of the first battery pack. The maximal 30-seconds discharge pulse current a battery cell can withstand is parameter that indicates how much power [Watt] a battery cell can supply, since power equals voltage [Volt] multiplied with current [Ampere]. Hence, a high discharge pulse current enables a high power pulse output with a constant nominal voltage of the electrical battery system, although the real voltage typically drops during high power pulse output.

The relatively large maximal 30-seconds discharge pulse current providable by the battery cells of the second battery pack means that relatively high power output is available from the electrical battery system immediately upon cold start of the vehicle, such that a relatively high performance is ensured while keeping the volume of the better insulated battery cells of the second battery pack relatively small.

On the other hand, the battery cells of the first battery pack, that has less insulation, have a higher energy density, i.e. nominal energy capacity per unit volume [Wh/litre], than the battery cells of the second battery pack, such that the total electrical battery system, after having reached an acceptable temperature level after cold start, can still provide a relatively long vehicle operating range.

In one example embodiment, a total volume of all battery cells in the second battery pack is less than 40%, specifically less than 25%, and more specifically less than 10% of a total volume of all battery cells in the first battery pack. Thereby, the volume of the second battery pack that should be better insulated is kept relatively small, such that the total package space of the electrical battery system is kept small and flexible.

In a further example embodiment, the first battery pack has at least 5 times, specifically at least 10 times, and more specifically at least 20 times larger total nominal energy capacity (kWh) than the second battery pack. Considering that the battery cells in the second battery pack typically are used more for handling power-peaks and regeneration-peaks that the battery cells in the first battery pack, the lifetime of the second type of battery cells is generally shorter than the lifetime of the first type of battery cells. Consequently, by having a second battery pack than is significantly smaller than the first battery pack, the cost for renewal of the second battery pack may be kept relatively low.

In still a further example embodiment, the first battery pack is located in a first casing and the second battery pack is located in a second casing, and wherein a thermal heat transfer coefficient (Watt per square metre multiplied with thermal conductivity—[$W/(m^2K)$]) of the second casing is at least 50% lower, specifically at least 75% lower, and more specifically at least 90% lower, than a thermal heat transfer coefficient [$W/(m^2K)$] of the first casing. By having a second casing with a relatively low thermal heat transfer coefficient, i.e. a relatively good insulation, compared with the first casing, the amount of energy necessary for maintaining the temperature of the battery cells of the second battery pack above a minimum acceptable temperature level is relatively low. And by having a first casing with a relatively high thermal heat transfer coefficient, i.e. a relatively poor insulation, compared with the first casing, the total volume of the electrical battery system can be kept relatively low, thereby simplifying packaging of the electrical battery system in the vehicle.

According to yet a further example embodiment, the second battery pack comprises an electrical heating device for heating the battery cells of the second battery pack. This may be an efficient approach for maintaining the temperature of the battery cells of the second battery pack above a minimum acceptable temperature level even at low ambient temperatures. The electrical heating device may for example be an electrically conductive wire that converts electricity into heat through the process of resistive heating. Alternatively, or in combination with an electrical heating device, heating of the battery cells of the second battery pack may be accomplished by controlling the current to flow back and forth between the first and second battery packs and thereby generating heat.

In one example embodiment, the second battery pack has a total nominal energy capacity in the range of 0.5-20 kWh (Kilowatt hour), specifically in the range of 0.7-5 kWh, and more specifically in the range of 1-2 kWh. The total nominal energy capacity of the second battery pack may be selected to fit the specific application. For example, in a relatively high performance battery electric vehicle with a total nominal energy capacity of the first battery pack in the range of maybe 60-150 kWh and with a relatively high demand for a dynamic response the total nominal energy capacity may be closer to 20 kWh. On the other hand, in a more moderate performance battery electric vehicle with less demand for a dynamic response the total nominal energy capacity of the second battery pack may be closer to 2 kWh.

In one example embodiment, the second battery pack has a nominal output voltage on the range of 60-500 Volts, specifically in the range of 100-400 Volts.

In one example embodiment, the first battery pack has a nominal output voltage on the range of 200-500 Volts, specifically in the range of 300-400 Volts.

It may be advantageous to have the nominal voltages of the first and second battery packs as close to each other as possible, because thereby the power sharing between the first and second battery packs is simplified. A DC/DC converter connecting the first and second battery packs to each other is however still needed due to different voltage drops of the battery cells when loading the first and second battery packs unevenly, and due to different voltage caused by different SoC (State of Charge) levels of the first and second battery packs.

Moreover, it may be advantageous to have the nominal voltages of the first and second battery packs as high as possible because thereby the output power can be high with maintained current level.

According to still a further example embodiment, due to the better thermal insulation of the battery cells of the second battery pack than the battery cells of the first battery pack, an operating temperature of the battery cells of the second battery pack is at least 10° C. higher, specifically at least 20° C. higher, and more specifically at least 30° C. higher, than an operating temperature of the battery cells of the first battery pack after having: heated the battery cells of the first and second battery packs until the operating temperature of the battery cells of the first and second battery packs reached 30° C., placed the electrical battery system at an ambient temp of −15° C., and waited for 12 hours. Thereby, improved cold start performance of the electrical battery system is accomplished while avoiding spacious insulation of the entire battery system.

According to a further aspect of the present disclosure it is, there is provided a vehicle drive train comprising the electrical battery system according to the description above and further comprising an electric propulsion motor, a bidirectional DC/DC converter connecting the second battery pack with the electrical motor, and an electronic controller arrangement for controlling the operation of the DC/DC converter, wherein the electronic controller arrangement is configured to, upon cold start of the vehicle drive train, use primarily the second battery pack for vehicle propulsion and/or vehicle energy regeneration.

Cold battery cells, such as for example Lithium-Ion cells, typically have heavily reduced performance in cold temperature state compared with warm temperature state. Hence, both vehicle acceleration and vehicle regeneration have decreased performance. However, by having the second battery pack adequately insulated the temperature of the battery cells of the second battery pack may by kept relatively high, and by having the electronic controller arrangement configured to use primarily the second battery pack for vehicle propulsion and/or vehicle energy regeneration upon cold start of the vehicle drive train, the poor performance otherwise associated with cold start of the battery electric vehicle can be avoided.

The term "primarily" here refers for example to a power split ratio in the range of 60/40 to 100/0, specifically in the range of 75/25 to 100/0, between the output power of the second battery pack relative to the output power of the first battery pack.

According to still a further example embodiment, due to the better thermal insulation of the battery cells of the second battery pack than the battery cells of the first battery pack, an operating temperature of the battery cells of the second battery pack is at least 10° C. higher, specifically at least 20° C. higher, and more specifically at least 30° C. higher, than an operating temperature of the battery cells of the first battery pack after having: heated the battery cells of the first and second battery packs until the operating temperature of the battery cells of the first and second battery packs reached 30° C., placed the electrical battery system at an ambient temp of −15° C., and waited for 12 hours. The better thermal insulation of the smaller second battery pack with more power optimized battery cells enables more or less full battery performance directly upon vehicle cold start, in particular with respect to electrically powered vehicle acceleration and regenerative braking, thereby offering a substantially improved cold start performance over prior art solutions, while avoiding spacious insulation of the entire battery system.

According to still a further example embodiment, the electronic controller arrangement may further be configured to, in a vehicle drive train propulsion operating mode and when the operating temperature of the first battery pack is above a predetermined minimum temperature level, use primarily the first battery pack for vehicle propulsion, and to cap electrical power supply from the first battery pack at a first power threshold level and supply requested additional electrical power from the second battery pack. The first type of battery cells may suffer from damages if exposed to over-current during high acceleration and regeneration events, such that the lifetime of the first type of cells is reduced. However, since second type of battery cells can withstand a larger maximal 30-seconds discharge pulse current than the first type of battery cells, the second type of battery cells may be used to cap those current edges that otherwise may be harmful to the first type of battery cells. The current split, i.e. power split, between the first and second battery packs may be controlled by the DC/DC converter. The specific power limit of the power split may be fixed or variable.

Parameters to consider when determining a suitable power limit may be the battery cell characteristic (power optimized cells or energy optimized cells) of the first and second battery packs, the nominal energy capacity of the first and second battery packs, SOC level of the first and second battery packs, temperature of the first and second battery packs and/or max peak power of the first and second battery packs, etc. There will thus be static limits set by battery pack hardware and dynamic limits controlled by the electronic controller. The control of the momentary and continuously adaptable power split may for example be implemented by means of Pulse Width Modulation (PWM) in the DC/DC converter.

Furthermore, according to still a further example embodiment, the electronic controller arrangement may further be configured to, in a vehicle drive train regeneration operating mode and when the operating temperature of the first battery pack is above a predetermined minimum temperature level, use primarily the first battery pack for vehicle energy regeneration, and to cap regenerated electrical charging power to the first battery pack at a second power threshold level and supply additional regenerated electrical charging power to the second battery pack. As discussed above, the first type of battery cells may suffer from damages if exposed to high currents during high acceleration and regeneration events, and a power split between the first and second battery packs, controlled by the DC/DC converter, may be implemented for avoiding excessively damaging high currents supplied to or from the first battery pack.

Many more example embodiments of the configuration of the electronic controller are possible depending on the circumstances of each specific implementation. In fact, the underlying concept of the disclosure to provide the electrical battery system with at least two battery packs with different configuration in terms of battery cell characteristic and insulation level, enables a large variety of operation modes by continuously controlling the amount of current that is drawn or supplied to each of the at least two battery packs for accomplishing an electrical battery system for a vehicle that provides improved performance, lower cost, lower weight, reduced volume and improved lifetime.

Hence, depending on the circumstances of each specific implementation the momentary status of the first and second battery packs, the specific power split between the first or the second battery pack during acceleration or regeneration is continuously varied and adapted to provide high performance and long lifetime, at least of the large battery pack.

In one example embodiment, the drive train further comprises a heating system configured for transferring heat generated in the electrical motor and/or the DC/DC converter to the first battery pack for heating the battery cells of the first battery pack. The heating system may for example comprises fluid pipes connecting the electrical motor and/or the DC/DC converter with the first battery pack, wherein a heat-transfer fluid is arranged to circulate within the fluid pipes to transfer heat generated in the electrical motor and/or the DC/DC converter to the first battery pack for heating the battery cells of the first battery pack. Thereby the heat loss of the electrical motor and/or the DC/DC converter can be used for more quickly increase the temperature of the battery cells of the first battery pack to an acceptable level, such that performance and lifetime of the first battery pack is improved, particularly during cold start.

In one example embodiment, the DC/DC converter is designed as a Buck-Boost converter, and the electronic controller arrangement is configured to control the power share between the first and second battery packs by controlling the PWM duty-cycle of the Buck-Boost converter. This has the advantage of omitting the need for a more costly galvanically isolated DC/DC converter, which typically use a transformer to electrically isolate the converter output from the converter input. A non-isolated switching regulator, such as a PWM duty-cycle controlled Buck-Boost converter, represents a more cost-efficient solution that also enables reduced size and weight of the DC/DC converter.

In one example embodiment, the electronic controller arrangement is configured to operate the Buck-stage of the Buck-Boost converter when supplying regenerated electrical charging power from the electrical propulsion motor to the second battery pack.

In one example embodiment, the electronic controller arrangement is configured to operate the Boost-stage of the Buck-Boost converter when supplying electrical power from the second battery pack to the electrical propulsion motor and/or to the first battery pack.

According to a further aspect of the present disclosure, the disclosure relates to vehicle comprising the electrical battery system as described above, wherein each of the first and second battery packs has an individual battery pack fastening system for immobilizing the battery packs within the vehicle, and wherein the fastening system of the second battery pack is operable separately from the fastening system of the first battery pack, such that the second battery back can be dismounted and/or replaced without having to dismount also the first battery pack. The second smaller battery pack has battery cells that are better suited to supply and be charged with high currents. This may advantageously be used for avoiding damaging supply and charging currents of the first larger battery pack. As a result, the lifetime of the first larger battery pack may be longer than the lifetime of the second smaller battery pack. This has economic benefits since the cost for replacement of only the second smaller battery pack is typically significantly smaller than replacement of a complete single battery pack. However, for swift and cost-effective replacement of only the second smaller battery pack it may be advantageous if the fastening system of the second battery pack is operable separately from the fastening system of the first battery pack, such that the second battery back can be dismounted and/or replaced without having to dismount also the first battery pack.

According to still a further aspect of the present disclosure, the disclosure relates a vehicle drive train comprising an electrical battery system having a first battery pack and a second battery pack, wherein the battery cells of the second battery pack are better thermally insulated than the battery cells of the first battery pack. The vehicle drive train further comprises an electric propulsion motor, a bidirectional DC/DC converter connecting the second battery pack with the electrical motor, and an electronic controller arrangement for controlling the operation of the DC/DC converter, wherein the electronic controller arrangement is configured to, upon cold start of the vehicle drive train, use primarily the second battery pack for vehicle propulsion and/or vehicle energy regeneration. By having the battery cells of the second battery pack better thermally insulated than the battery cells of the first battery pack, sufficient performance of the electrical battery system is secured during cold start of the vehicle, even at very low ambient temperatures, without having to waste large amount of energy on battery cell heating prior to the cold start, and by having the battery cells of the first battery pack less thermally insulated than the battery cells of the second battery pack the total volume of the electrical battery system can be kept smaller.

According to still a further aspect of the present disclosure, the disclosure relates to a method for controlling operation of a vehicle drive train comprising an electrical battery system having a first battery pack and a second battery pack, wherein the battery cells of the second battery pack are better thermally insulated than the battery cells of the first battery pack, an electric propulsion motor, a bidirectional DC/DC converter connecting the second battery pack with the electrical motor, and an electronic controller arrangement for controlling the operation of the drive train, the method comprising: upon detecting cold start of the vehicle drive train, using primarily the second battery pack for vehicle propulsion and/or vehicle energy regeneration. This arrangement has the advantage of providing sufficient performance of the electrical battery system during cold start of the vehicle while keeping the total volume of the electrical battery system small, as discussed above.

In one example embodiment, the method additionally comprises: when operating the vehicle drive train in a propulsion operating mode and when the operating temperature of the first battery pack is above a predetermined minimum temperature level, using primarily the first battery pack for vehicle propulsion, and capping electrical power supply from the first battery pack at a first power threshold level and supply requested additional electrical power from the second battery pack.

In one example embodiment, the method additionally comprises: when operating the vehicle drive train in a regeneration operating mode and when the operating temperature of the first battery pack is above a predetermined minimum temperature level, using primarily the first battery pack for vehicle energy regeneration, and capping regenerated electrical charging power to the first battery pack at a second power threshold level and supplying additional regenerated electrical charging power to the second battery pack. As discussed above, the first type of battery cells may suffer from damages if exposed to high current during high acceleration and regeneration events and a power split between the first and second battery packs, controlled by the DC/DC converter, may be implemented by capping the current supplied to drawn from the first battery pack for avoiding any high currents supplied to or from the first battery pack.

Further features of, and advantages with, the present disclosure will become apparent when studying the appended claims and the following description. The skilled person realizes that different features of various embodiments of the present disclosure may be combined to create embodiments other than those explicitly described in the disclosure, without departing from the scope of the present disclosure, because an explicit disclosure of all possible combinations of features and/or embodiments of the disclosure is not feasible or realistic.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION OF EXAMPLE EMBODIMENTS OF THE DISCLOSURE

Figure 1:
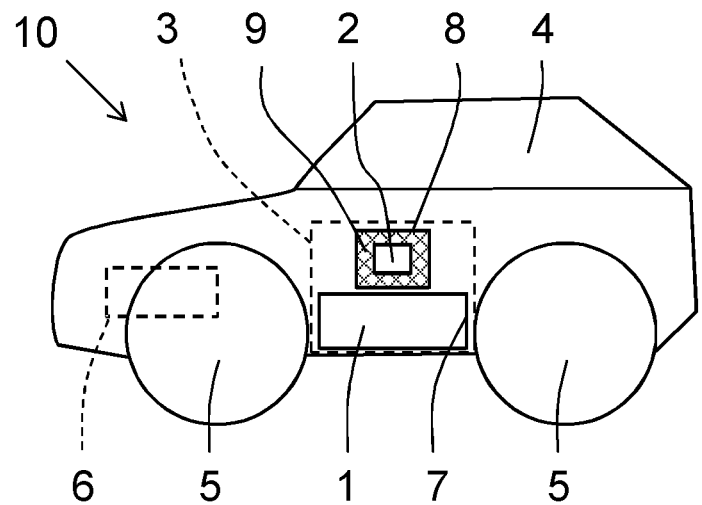
FIG. 1 schematically shows a vehicle comprising an example embodiment of the electrical battery system according to the disclosure, FIG. 2 schematically shows an example embodiment of a more detailed view of the electrical battery system according to the disclosure, FIG. 3 schematically shows a layout of a vehicle drive train according to an example embodiment of the disclosure, FIG. 4 schematically shows the example layout of FIG. 3 with more details of an example DC/DC converter, FIG. 5 schematically shows typical performance of a battery cell as a function of temperature, FIG. 6-8 schematically show various example embodiments of power sharing between different battery packs, FIG. 9 schematically shows an example layout of a vehicle drive train with a heating system according to an example embodiment of the disclosure, FIG. 10 schematically shows a further layout of a vehicle drive train according to an example embodiment of the disclosure, FIG. 11 schematically shows a chilldown sequence of a first embodiment of the first and second battery packs, and FIG. 12 schematically shows a chilldown sequence of a further embodiment of the first and second battery packs.

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Referring now to FIG. 1, there is depicted a vehicle 10 in form of a car with a driver compartment 4 and driving wheels 5. The vehicle 10 is for example a battery electric vehicle with one or more electrical propulsion motors 6 electrically connected with the electrical battery system 3 for driving the driving wheels 5. Alternatively, the vehicle may be a plug-in or non-plug-in hybrid electric vehicle with both a combustion engine and an electrical motor connected in series or parallel.

The vehicle 10 has an electrical battery system 3 comprising a first battery pack 1 and a second battery pack 2. The first battery pack 1 comprises an array of a first type of battery cells located within a first casing 7, and the second battery pack 2 comprises an array of a second type of battery cells located within a second casing 8.

The second casing 8 has a better thermal insulation than the first casing 7. This may be achieved for example by providing the walls of the second casing 8 with insulation material 9 and placing the array of second type of battery cells more or less surrounded by the insulation material 9. The insulation material 9 may be of any typical thermal insulation material, such as for example fiberglass, mineral wool, polyurethane foam, polystyrene, cellulose, or the like. The insulation material 9 may for example be fastened on or integrated in the inner walls, bottom and top of the second casing 8.

The first casing 7 is typically made of sheet metal or plastic material without any additional insulation material added to the walls of the first casing. However, in certain embodiments, a certain amount of insulation material may be provided also to the first casing 7, but not more than that the second casing 8 has a better thermal insulation than the first casing 7.

The heat transfer rate through a wall may be calculated from $q=U*A*(t_i-t_o)$, wherein U=thermal heat transfer coefficient or U-value (W/m²K), A=surface area normal to the heat flow (m²), $t_i$=inner temperature (K) and $t_o$=outer temperature (K). A wall of the second casing thus has a lower U-value than a wall of the first casing, because a better-insulated wall has a lower thermal heat transfer coefficient than a worse-insulated wall.

The thermal heat transfer coefficient (U-value) is equal to: 1/(wall thickness [m]×thermal conductivity of the wall material [W/m×K]). Hence, both the wall thickness and thermal conductivity of the wall material of the casings are relevant parameters for determining the thermal heat transfer coefficient.

Having battery cells of the second battery pack being better thermally insulated than the battery cells of the first battery pack corresponds to a situation where the thermal heat transfer coefficient of the walls of the second casing is lower than the thermal heat transfer coefficient of the walls of the first casing.

In particular, the thermal insulation properties of the walls of the second casing is at least 50% lower, specifically at least 75% lower, and more specifically at least 90% lower, than the thermal heat transfer coefficient of the walls of the first casing. This may be realised by having relatively thick walls of the second casing and/or by having the walls of the second casing made of material having relatively low thermal conductivity.

FIG. 1 schematically shows a first arrangement of the electrical battery system 10, wherein each of the first and second battery packs 1, 2 may be separate and individual battery packs that are located spaced apart from each other in the electrical battery system 3. For example, the first battery pack may be integrated into the floor of the vehicle or located in the rear trunk of the vehicle, and the second battery pack 2 may be located within the driver compartment 4, because the driver compartment 4 is typically heated and this may assist warm keeping of the second battery cells.

Figure 2:
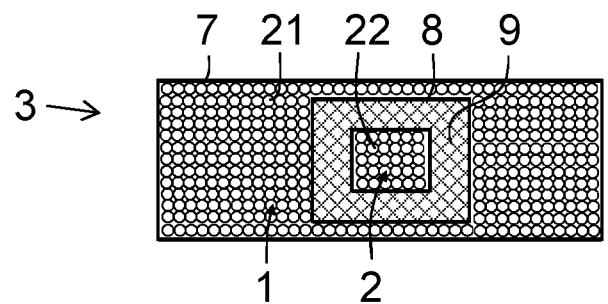

FIG. 2 schematically shows an alternatively arrangement of the electrical battery system 10, where the second battery pack 2 may be integrated into the first battery 1. This may be advantageous because after stopping use of the electrical battery system 3, such as upon parking of the vehicle, the slowly cooling battery cells 21 of the first battery pack 1 may then assist in keeping the temperature of the battery cells 22 of the second battery pack 2 above an acceptable temperature limit. The battery cells 21, 22 are here schematically illustrated as densely packed cylindrical type battery cells.

Each of the first and second battery packs 1, 2 may have an individual battery pack fastening system (not showed) for immobilizing the battery packs 1, 2 within the vehicle 10, wherein the fastening system of the second battery pack 2 may be operable separately from the fastening system of the first battery pack 1, such that the second battery back 2 can be dismounted and/or replaced without having to dismount also the first battery pack 1. This is particularly advantageous when an expected lifetime of the first and second battery packs 1, 2 differs, and for example the second battery pack may be expected to be replaced individually from the first battery pack 1.

The first battery pack 1 has a larger total nominal energy capacity in terms of watt hours [Wh] than the second battery pack 2. Hence, it is the smaller second battery pack 2 that is provided with better thermal insulation, thereby avoiding a costly and undesirable voluminous thermal insulation of the larger first battery pack 1.

The second type of battery cells 22 withstands a larger maximal 30-seconds discharge pulse current than the first type of battery cells 21. In other words, the second type of battery cells 22 are more power optimized than the first type of battery cells 21, meaning that the second battery cells are better suited to supply large currents during for example vehicle acceleration and to be charged with large currents during for example vehicle regeneration. Vehicle regeneration herein means the operation of the electrical motor 6 as an electrical generator for converting vehicle speed into electrical energy that is stored in the electrical battery system 10.

The maximum 30-seconds discharge pulse current corresponds to the maximum current at which the battery can be discharged for pulses of up to 30 seconds. This limit is usually defined by the battery manufacturer in order to prevent excessive discharge rates that would damage the battery or reduce its capacity.

The first type of battery cells 21 have a higher nominal energy capacity per unit volume [Wh/litre] than the second type of battery cells 22. In other words, the first type of battery cells 21 are more energy optimized than the second type of battery cells 22, such that a long operating range of the vehicle is obtained.

Hence, by having an electrical battery system 3 divided into battery packs, i.e. sections, with a first large battery pack 1 including more energy optimized battery cells 21 and with a second smaller battery pack 2 including more power optimized battery cells 22, more dynamic vehicle behaviour can be accomplished with nearly maintained vehicle operating range.

By having the second type of battery cells 22 more power optimized than the first type of battery cells 21 in combination with having the second battery pack better thermally insulated that the first battery pack, the vehicle will behave and perform as if the entire electrical battery system 10 has a sufficient operating temperature and provide maximal acceleration and regeneration performance directly upon cold start, even if only the second battery pack 2 in fact has a sufficient operating temperature.

As illustrated in FIGS. 1 and 2, the total volume of all battery cells 22 in the second battery pack 2 is significantly smaller than a total volume of all battery cells 21 in the first battery pack 1, in particular about a 1:10 ratio. Thereby the volume that shall have better insulation is kept small for avoiding a voluminous total size of the electrical battery system 3. The specific relative dimensions of the first and second battery packs 1, 2 may of course vary according to the specific circumstance. For example, the total volume of all battery cells 22 in the second battery pack 2 may be less than 40% of the total volume of all battery cells 21 in the first battery pack 1. Alternatively, the total volume of all battery cells 22 in the second battery pack 2 may be less than 25%, or even less that 10%, of the total volume of all battery cells 21 in the first battery pack 1.

Correspondingly, with a relatively small volume of the second type of battery cells 22 and a relatively large volume of first type of battery cells 21, the first battery pack 1 typically has a significantly larger total nominal energy capacity (kWh) than the second battery pack 2. Not only due to the significant large size, but also due to the fact that first type of batter cells have a higher energy density, i.e. more energy per unit volume [Wh/litre] than the second type of battery cells 22. For example, the first battery pack 1 may have at least 5 times larger total nominal energy capacity (kWh) than the second battery pack 2. Alternatively, the first battery pack 1 may have has at least 10, or even at least 20 times larger total nominal energy capacity (kWh) than the second battery pack 2.

In real numbers, the total nominal energy capacity (kWh) of the first and second battery packs 1, 2 will vary according to the specific circumstances. For example, the total nominal energy capacity of the first and second battery packs jointly may in a plug-in hybrid electric vehicle typically be around 5-20 kWh and in a battery electric (full electric) vehicle typically be around 20-100 kWh.

According to one example embodiment the second battery pack 2 may have a total nominal energy capacity (kWh) in the range of 0.5-20 kWh. However, according to another example embodiment the second battery pack 2 may have a total nominal energy capacity (kWh) in the range of 0.7-5 kWh, or possibly in the range of 1-2 kWh.

Considering that it is desirable to have a small total volume of the electrical battery system it is desirable to keep the size of the second battery pack 2 relatively small in view of the relatively thick insulation walls of the second casing 8. Consequently, the total nominal energy capacity (kWh) of the second battery pack 2 may for example be in the range of about 2-30% of the total nominal energy capacity (kWh) of the first battery pack 2, and sometimes in the range of about 2-10% of the total nominal energy capacity (kWh) of the first battery pack 2.

The nominal output voltage of the first and second battery packs 1, 2 may be selected to be substantially identical, plus minus about 10%, because this may simplify the power split between the first and second battery packs 1, 2. However, in certain implementations the second battery pack 2 may have a lower nominal output voltage than the first battery pack 1.

Moreover, nominal output voltage of the first and second battery packs 1, 2 may be selected to be in the range of about 200-500 Volts, and sometimes in the range of 300-400 Volts.

Even if the second batter pack 2 is provided with a relatively good thermal insulation the temperature of the battery cells 22 of the second battery pack 2 will sooner or later reach a minimal acceptable level for enabling sufficient acceleration and regeneration performance directly after a cold start. For avoiding that the temperature of the battery cells 22 of the second battery pack 2 sinks below said minimal acceptable level the second battery pack may comprise an electrical heating device for heating the battery cells of the second battery pack 2. Thereby it is ensure that the temperature of the battery cells 22 of the second battery pack 2 will be maintained above the minimal acceptable temperature level. This minimal acceptable temperature level may be constant of variable depending on SoC of the first and/or second battery pack 1, 2.

The electrical heating device may for example be an electrically conductive wire that converts electricity into heat through the process of resistive heating. Alternatively, or in combination with an electrical heating device, heating of the battery cells of the second battery pack 2 may be accomplished by controlling the current to flow back and forth between the first and second battery packs 1, 2 and thereby generating heat in the second battery pack 2.

Figure 3:
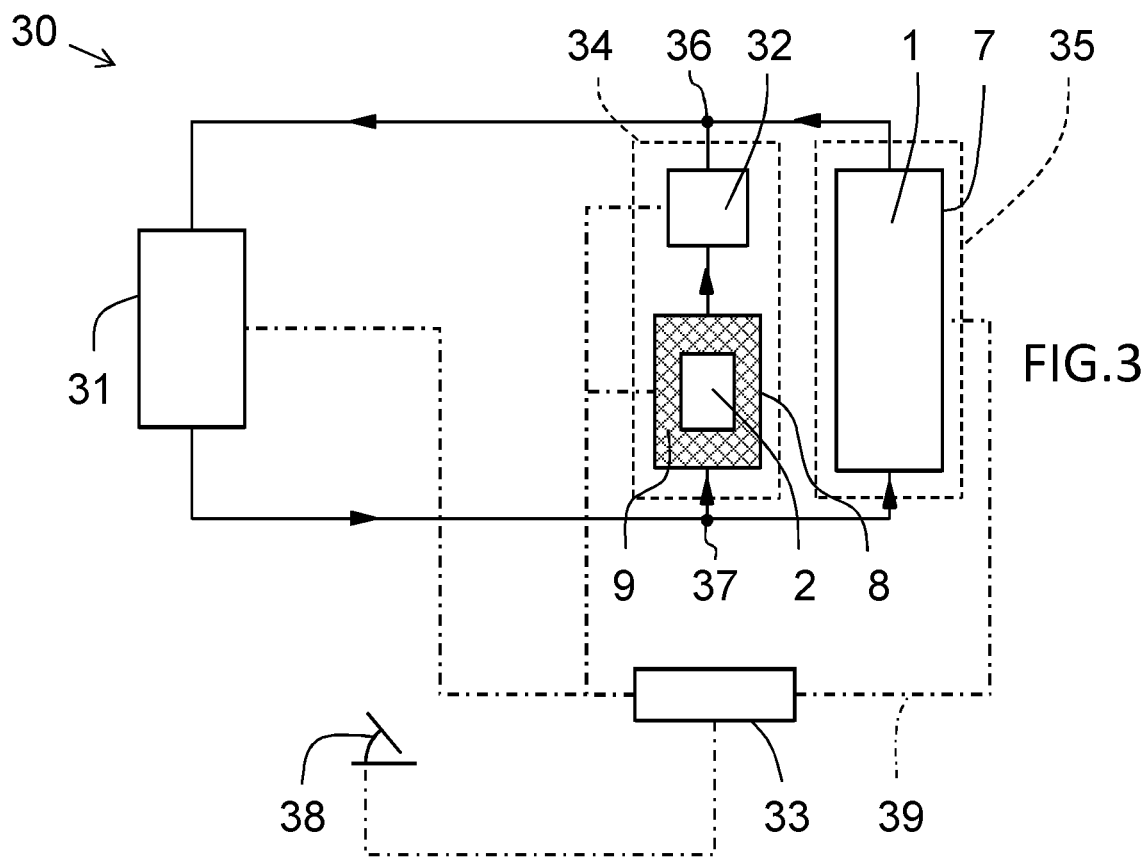

FIG. 3 schematically illustrates an example embodiment of the electrical battery system 3 implemented in a vehicle drive train 30. The vehicle drive train 30 further comprises an electric propulsion motor 31, a bidirectional DC/DC converter 32 and an electronic controller arrangement 33.

The electric propulsion motor 31 may be a DC or AC motor. If the electric propulsion motor 31 is an AC motor an inverter or the like is used for transforming the DC supplied from the electrical battery system 3 to AC that is subsequently fed to the electric propulsion motor 31.

The first battery pack 1 is electrically directly connected to the electric propulsion motor 31, possibly via a set of high-voltage DC switches (not showed) that may be used as safety switches in case of repair or maintenance of the drive train, or the like.

The second battery pack 2 is connected to the electrical motor 31 via the bidirectional DC/DC converter 32. The second battery pack 2 and DC/DC converter 32 are thus connected in series and form a first circuit branch 34, and the first battery pack 1 forms a second circuit branch 35 that is connected in parallel with first circuit branch 34 at a first and second connection point 36, 37.

The electronic controller arrangement 33, which may comprise a single or multiple interconnected electronic controllers, may for example control operation of the electrical propulsion motor 31 mainly as a function of sensor input from an accelerator pedal 38 position sensor and sensor input from an brake pedal 38 position sensor. The electronic controller arrangement 33 may further receive sensor input about the current SoC (State of Charge) of the first and second battery packs 1, 2, as well as operating temperature of the first and second battery packs 1, 2. The sensor input may be received via conducting wire 39 and/or wirelessly.

Based on this information the electronic controller arrangement 33 may control the DC/DC converter to provide a suitable power split between the first and second battery packs 1, 2, taking into account relevant operating parameters, such as SOC level of each battery pack 1, 2, operating temperature of each battery pack 1, 2, total nominal energy capacity (kWh) of each battery pack, maximal nominal charging and discharging current of each battery pack 1, 2, or the like.

The electronic controller arrangement 33 will thus, both in propulsion operating mode and regeneration operating mode, determine a suitable power split between the first and second battery packs 1, 2 based on both static operating parameter limits determined by the specific hardware of the drive train and dynamic operating parameters limits controlled by software of the electronic controller arrangement 33.

The DC/DC converter 32 may for example be designed as a Buck-Boost converter, wherein the electronic controller arrangement 33 is configured to control the power share between the first and second battery packs 1, 2 by controlling the PWM duty-cycle of the Buck-Boost converter.

In the example embodiment of FIG. 3 the Boost stage of the Buck-Boost converter operates and current is supplied from both the first and second battery packs 1, 2, to the electrical motor 31.

Figure 4:
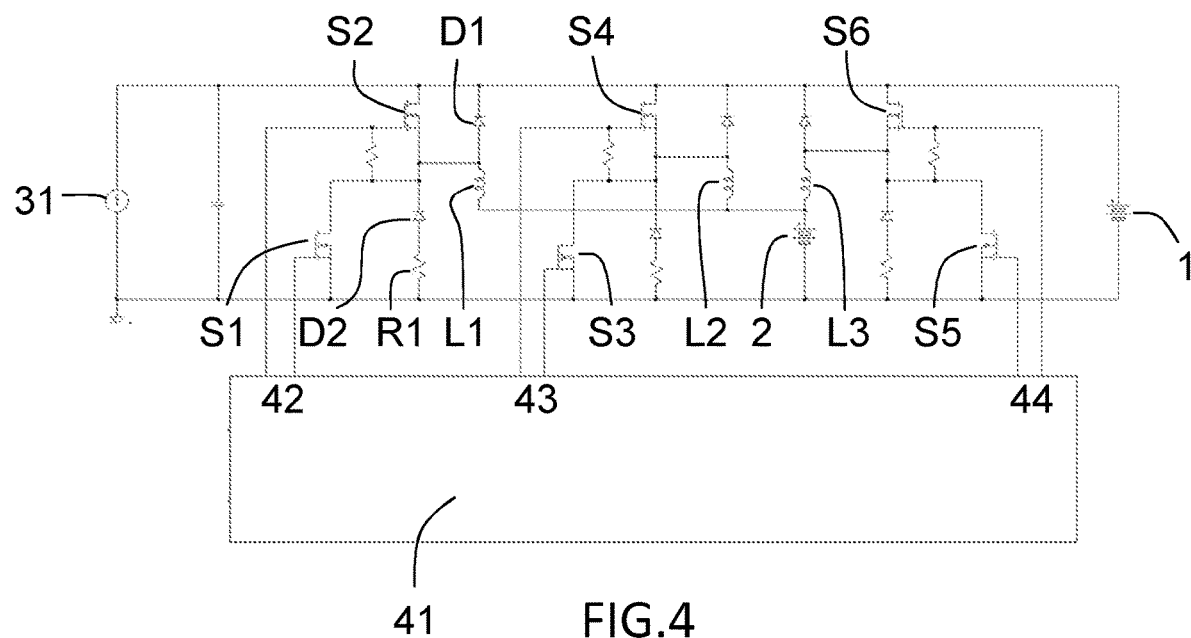

FIG. 4 schematically shows an example embodiment of the electrical battery system 3 implemented in a vehicle drive train 30 and with a more detailed example implementation of the DC/DC converter as a Buck-Boost converter. In particular, the example circuit design of FIG. 4 shows a 3-phase Buck-Boost converter. A buck-boost converter with other number of phases may alternatively be used, such as for example 1-phase, 2-phase, 6-phase or 12-phase Buck-Boost converter. More phases typically results in a smoother DC with less ripple.

The example 3-phase Buck-Boost converter shown in FIG. 4 comprises a PWM controller 41 which is arranged to control the operation of first to sixth switching transistors S1-S6. The first, third, and fifth switching transistors S1, S3, S5 are associated with the Boost stage of the Buck-Boost converter and the second, fourth, and sixth switching transistors S2, S4, S6 are associated with the Buck stage of the Buck-Boost converter. The first to third inductors are common to the Buck-Boost converter.

A first gate drive 42 of the PWM controller 41 controls operation of the first and second switching transistors S1, S2 which are associated with the first phase of the 3-phase Buck-Boost converter. A second gate drive 43 of the PWM controller 41 controls operation of the third and fourth switching transistors S3, S4 which are associated with the second phase of the 3-phase Buck-Boost converter. And a third gate drive 44 of the PWM controller 41 controls operation of the fifth and sixth switching transistors S5, S6 which are associated with the third phase of the 3-phase Buck-Boost converter. The switching transistors S1-S6 associated with the first to third gate drives 42-44 are controlled to operate sequentially in the Buck or Boost stage for producing a smooth DC with little ripple effect.

The electronic controller arrangement 33 is configured to operate the Buck-stage of the Buck-Boost converter when supplying regenerated electrical charging power to the second battery pack 2, and the electronic controller arrangement 33 is configured to operate the Boost-stage of the Buck-Boost converter when supplying electrical power from the second battery pack to the electrical propulsion motor 31.

When the first phase of the Buck-Boost converter operates in the Boost stage the first switching transistor S1 is opened a certain time period to allow a current to flow from the second battery pack 2, in this direction, through the first inductor L1 and through the first switching transistor S1 and back to the second battery pack 2. During this time period the current passing through the first inductor L1 will generate a gradually increasing energy level stored in the magnetic field of the first inductor L1. When the first switching transistor subsequently closes, the collapsing magnetic field induces a current flow through the first inductor L1 in the same direction as the current was flowing when the current generated the magnetic field in the first place. Hence, the stored energy in first inductor will be gradually released be inducing a current that flows, in this direction, through the second battery pack 2, through the first inductor L1, through a first diode D1, to the electrical propulsion motor 31 and back to the second battery pack 2.

When the first phase of the Buck-Boost converter operates in the Buck stage the second switching transistor S2 is opened a certain time period to allow regenerated current from the electrical propulsion motor 31 to flow, in this direction, through the second switching transistor S2, through the first inductor L1, through the second battery pack 2 and back to the second battery pack 2. During this time period the current passing through the first inductor L1 will generate a gradually increasing energy level stored in the magnetic field of the first inductor L1. When the second switching transistor S2 subsequently closes, the collapsing magnetic field induces a current flow through the first inductor L1 in the same direction as the current was flowing when the current generated the magnetic field in the first place. Hence, the stored energy in first inductor L1 will be gradually released be inducing a current that flows, in this direction, through the first inductor L1, through the second battery pack 2, through a first resistance R1, through a second diode D2, and back to the first inductor L1.

The Buck and Boost stages of the second and third phases will operate correspondingly but offset in time to provide a sequential operating behaviour.

The Buck-Boost converter enables a large flexibility in terms of power sharing between the first and second electrical battery packs 1, 2, both when operating the Boost stage, i.e. vehicle drive train propulsion operating mode, wherein power in supplied from the electrical battery system, and when operating the Buck-stage, i.e. vehicle drive train regeneration operating mode, wherein power in fed to the electrical battery system for storing.

Regeneration operating mode corresponds to an operating mode when the electrical propulsion motor 31 operates as a generator for braking the vehicle. In other words, when the electrical propulsion motor 31 converts vehicle kinematic energy or vehicle potential energy into electrical energy to be stored in the electrical battery system, for the purpose of saving energy and avoiding energy loss be using conventional friction brakes.

The power sharing is controlled by controlling the amount of current that is supplied from and to the second electrical battery pack 2, and this is performed by controlling the PWM (Pulse Width Modulation) duty-cycle of the PWM-controller 41.

When operating the Buck-Boost converter in the Boost stage in principle 1-100% of the required power may be supplied by the second electrical battery pack 2 and the rest by the first electrical battery pack 1. The second electrical battery pack 2 may even be used for charging the first electrical battery pack 1.

Similarly, when operating the Buck-Boost converter in the Buck stage in principle 1-100% of the regenerated power may be supplied to the second electrical battery pack 2 and the rest to the first electrical battery pack 1. The first electrical battery pack 1 may even be used for charging the second electrical battery pack 2.

It is particularly advantageous to enable the Boost stage during cold start of the vehicle drive train because thereby power primarily from the better insulated second battery pack can be supplied.

Figure 5:
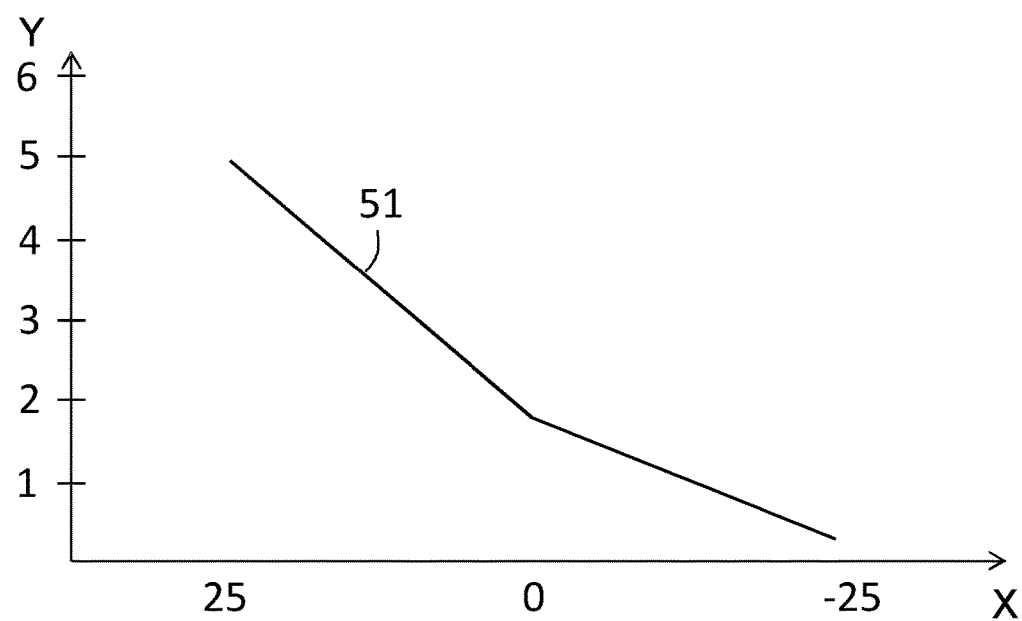

Cold batter cells, such as for example Lithium-Ion cells, typically have gradually reduced performance with reduced battery cell operating temperature. An example illustration of the performance vs battery cell operating temperature in schematically illustrated in FIG. 5, where the X-axis represent temperature in degrees Celsius and the Y-axis represents power density [kW/kg] of the batter cell. The line 51 schematically represents power density as a function of battery cell temperature. Clearly, the use of cold battery cells upon cold start results in significantly reduced performance in terms of power density, which results in correspondingly reduced performance both in terms of acceleration and regeneration efficiency of the vehicle drive train.

Consequently, by splitting the electrical battery system into at least two battery packs, of which at least a first larger battery pack is worse insulated for saving space and cost, and at least a second smaller battery pack is better insulated for maintaining the operating temperature of the associated battery cells within an acceptable temperature range, and by using a DC/DC converter that enables control of the power split between the first and seconds battery packs, significantly improved drive train performance may be accomplished upon cold start without having to provide voluminous insulation for the entire electrical battery system, and without having the spend significant amount of energy for heating the entire electrical battery system. Moreover, the lifetime of the battery cells may be increased by lowering the level of current that is allowed to be supplied or drained to/from the battery cells at low operating temperature.

The split electrical battery system with a poor insulated large first battery pack with energy optimised battery cells and a better insulated small second battery pack with power optimised battery cells further enables advantageous extension of the lifetime and maintenance cost of the electrical battery system, because the second battery pack may be advantageously used to remove most of the high power peaks from the energy optimized cells of the first battery pack, such that the lifetime of the battery cells of the first battery pack can be prolonged. The power optimised battery cells of the second battery pack 2 is better suited and adapted to withstand larger discharge and charge currents without suffering from reduced lifetime.

Furthermore, even if the power optimised battery cells of the second battery pack 2 need more frequent replacement due to the use thereof for handling high power peaks, the cost for replacement is relatively small because only the small second battery pack needs replacement, and the large first battery pack may be kept.

Figure 6:
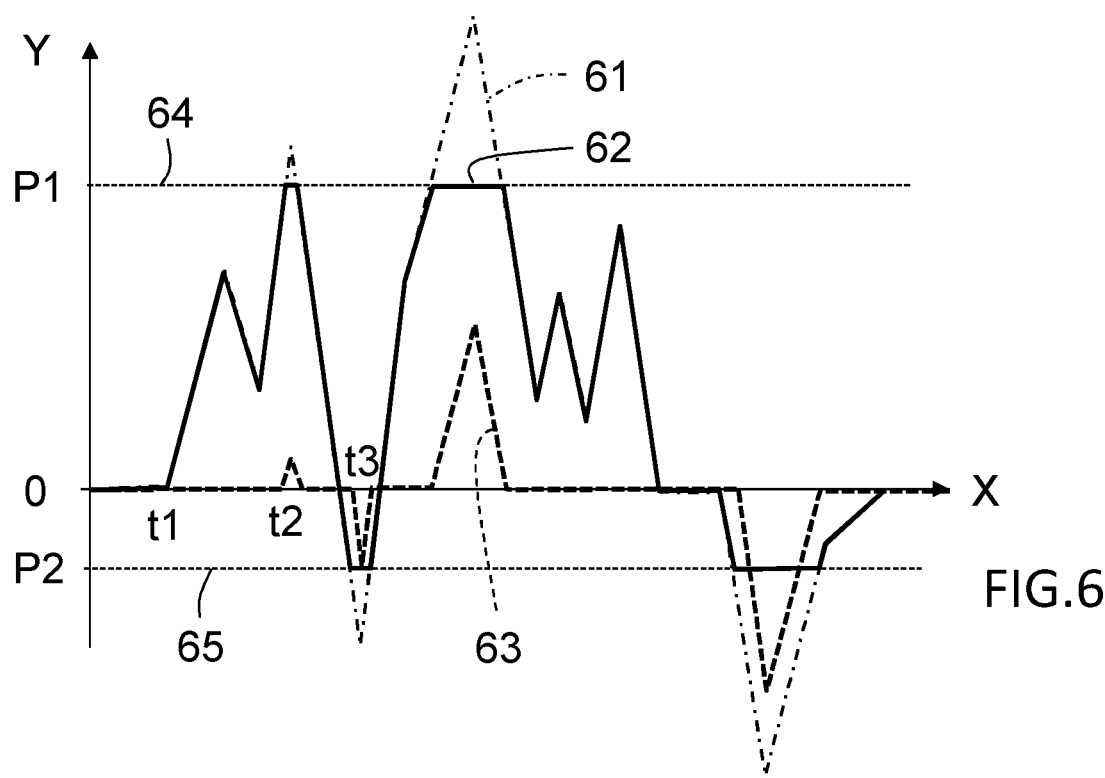

FIG. 6 schematically illustrates an example of power sharing output and input [kW] of the electrical battery system on the Y-axis over time [seconds] on the X-axis, wherein the battery cells of both the first and second battery packs 1, 2 have reached an acceptable operating temperature. Dash-dot line 61 represents total power output of the electrical battery system over time, wherein positive output power means power supplied from electrical battery system, and negative output power means power feed to electrical battery system (regeneration). Solid line 62 represents the output power from the first batter pack 1 and dotted line 63 represents the output power from the second batter pack 2.

A first power threshold level P1 and a second power threshold level P2 are illustrated in FIG. 6, wherein the first power threshold level P1 represents a maximal output power the first battery pack 1 is deemed capable to handle without unacceptable detrimental effects on lifetime, and wherein the second power threshold level P2 represents a maximal regeneration power the first battery pack 1 is deemed capable to handle without unacceptable detrimental effects on lifetime. These power threshold levels P1, P2 may be static based on hardware and/or dynamic based on operating parameters such as SoC level and operating temperature. Merely as an example, the first power threshold level P1 may be set to 30 kW and the second power threshold level P2 may be set to 7 kW.

At time t1 the drive train starts operating by supplying a linearly increasing power output from the first battery pack. No power is supplied from the second battery pack 2 at this time because the supplied power level is below the first power threshold level P1. At time t2 the requested output power exceeds the first power threshold level P1. Therefore, at time t2, power from the second battery pack 2 is briefly supplied by the DC/DC converter 32 to the electrical propulsion motor 31 to cap the power peak at time t2. As a result, about 30 kW output power from the first battery pack 1 is supplied to the electrical propulsion motor 31 and about 5 kW output power from the second battery pack 2 is supplied to the electrical propulsion motor 31. At time t2 the first and second battery packs 1, 2 are consequently operating in a power split mode.

Correspondingly, at time t3 a driver of a vehicle drive train may for example activate the brakes, such that large amount of regenerative energy is generated. At time t3 the supplied regenerated power exceeds the second power threshold level P2. Therefore, at time t3, regenerated power from the electrical propulsion motor 31 is briefly supplied by the DC/DC converter 32 to the second battery pack 2 in order to cap the regenerative power peak at time t3. As a result, about 7 kW regenerated power from the electrical propulsion motor 31 is fed to the first battery pack and about 5 kW power is fed from the electrical propulsion motor 31 to the second battery pack 2. Consequently, at time t3 the first and second battery packs 1, 2 are operating in a power split mode.

The example embodiment of power sharing output and input shown in FIG. 6 may of course have another setup with respect to the upper and lower threshold levels 64, 65, depending on the circumstances, hardware limits and software. For example, contrary to the example embodiment of FIG. 6, the second battery pack 2 may be set as primary choice and the first battery pack may be set of secondary choice, depending on the circumstances.

Figure 7:
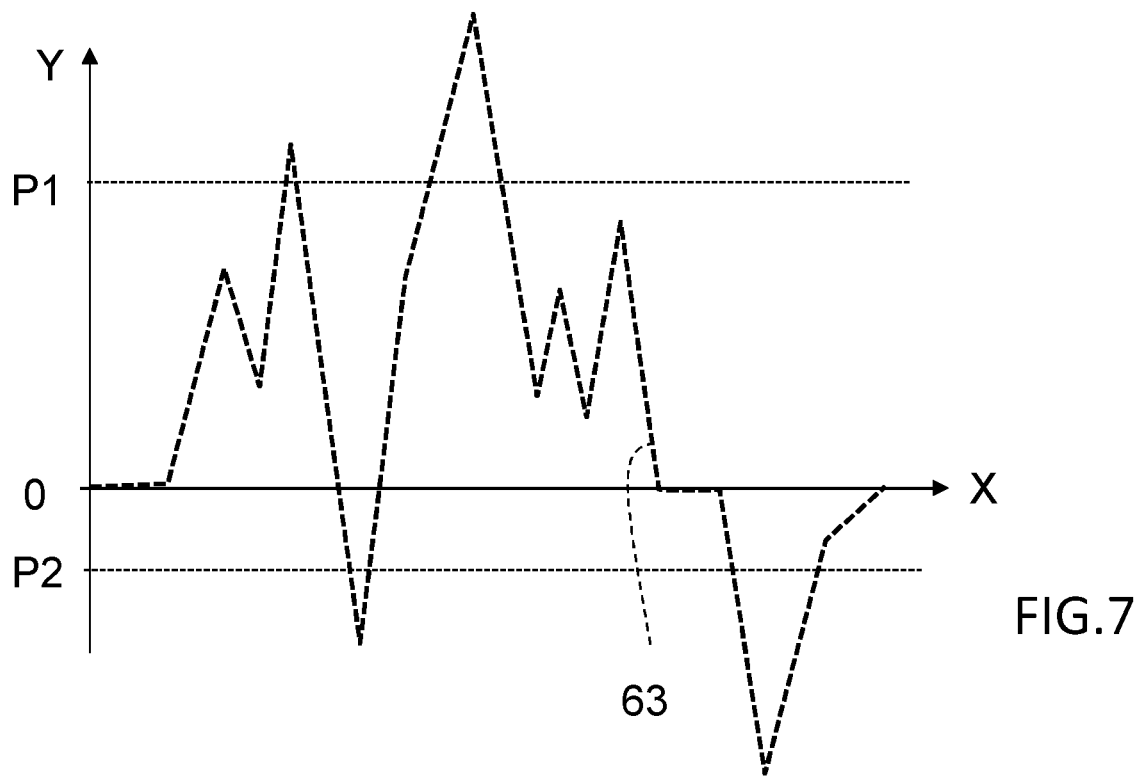

FIG. 7 schematically illustrates another example of power sharing output and input [kW] of the electrical battery system on the Y-axis over time [seconds] on the X-axis. Here, the electronic controller arrangement may advantageously be configured to, upon cold start of the vehicle drive train, use primarily the second battery pack for vehicle propulsion and/or vehicle energy regeneration. The dotted line 63 represents the output power from the second batter pack 2. Substantially no power is delivered by the cold first battery pack 1.

Figure 8:
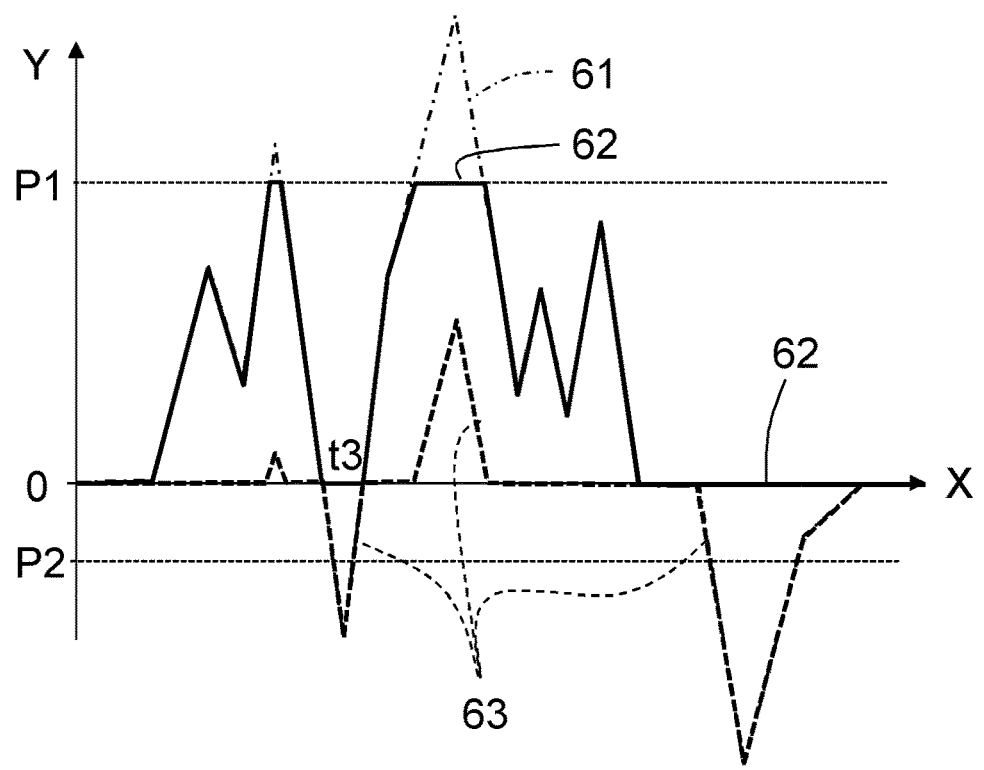

FIG. 8 schematically illustrates still a further example of power sharing output and input [kW] of the electrical battery system on the Y-axis over time [seconds] on the X-axis. This example embodiment functions identical to that of FIG. 6 except for the fact that the SoC level of the second battery pack 2 is low. Therefore, not only the power peaks of the regenerated power at time t3 is fed to the second battery pack 2 but the entire regenerated power at time t3. Thereby, the SoC level of the second battery pack 2 is increased faster.

The disclosure is not limited to the above-described power splitting operating modes, and many other power splitting operating modes are possible within the scope of the appended claims.

Even though the electronic controller arrangement 33 may be configured to, upon cold start of the vehicle drive train, use primarily the second battery pack for vehicle propulsion and/or vehicle energy regeneration, the first battery pack 1 may have to be heated during driving of the vehicle drive train for enabling improved performance from the first battery pack 1. The second battery pack 2 may for example be dimensioned for being able to more or less alone supply sufficient power during an initial time period upon cold start, but power from the larger first battery pack 1 is generally needed within a certain time period, such as for example within 3, 6 or 12 minutes from cold start.

Various ways of heating the battery cells of the first battery pack 1 is possible. For example, the first battery pack may comprise an electrically conductive wire that converts electricity into heat through the process of resistive heating. Alternatively, or in combination with an electrically conductive wire, heating of the battery cells of the first battery pack 2 may be accomplished by controlling the current to flow back and forth between the first and second battery packs 1, 2 and thereby generating heat in both the first and second battery packs 1, 2.

Figure 9:
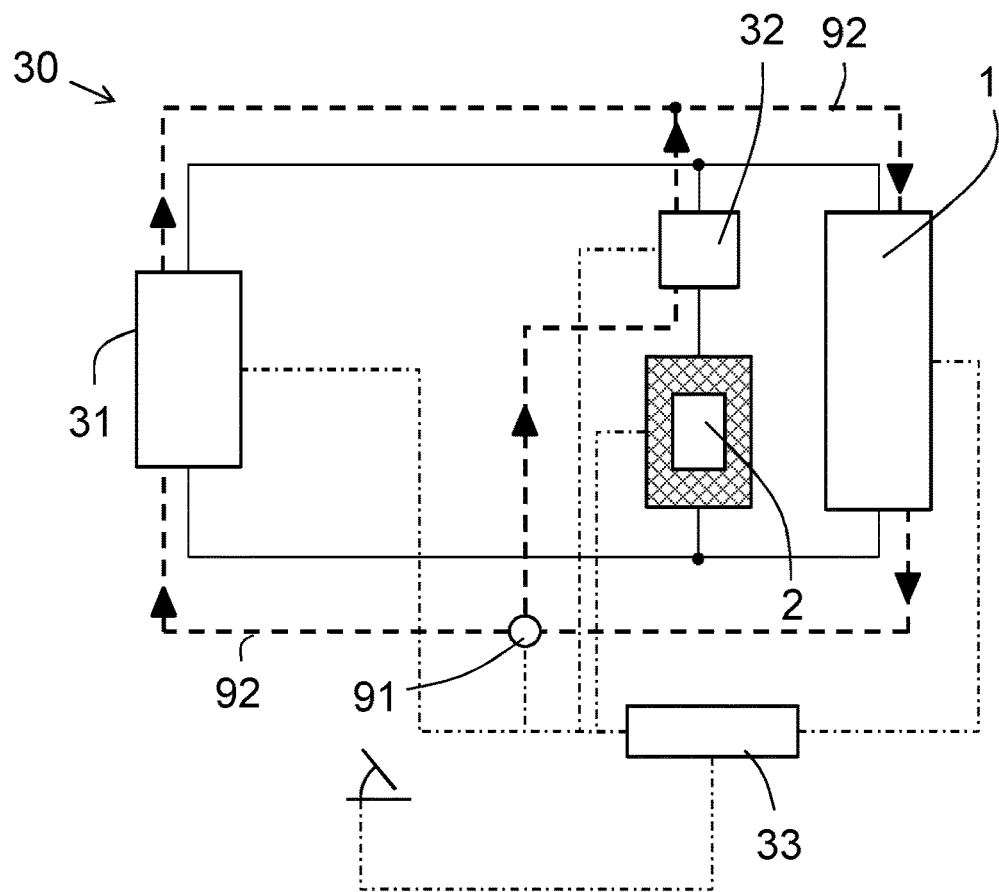

Still more alternatively, or in combination with above, the drive train may comprise a heating system configured for transferring heat generated in the electrical motor 31 and/or the DC/DC converter 32 to the first battery pack 1 for heating the battery cells of the first battery pack 1. This may for example be accomplished by having heat transfer fluid circulating in a piping system 92 between the electrical motor 31 and/or the DC/DC converter 32 and the first battery pack 1, as schematically illustrated in FIG. 9. For this purpose the electrical motor 31 and/or the DC/DC converter 32 and the first battery pack 1 may be provided with fluid transfer channels arranged for being connected to the piping system 92 for enabling said heat transfer to the first battery pack 1. A fluid pump 91 may be provided to secure a certain level of fluid flow in the piping system 92.

Figure 10:
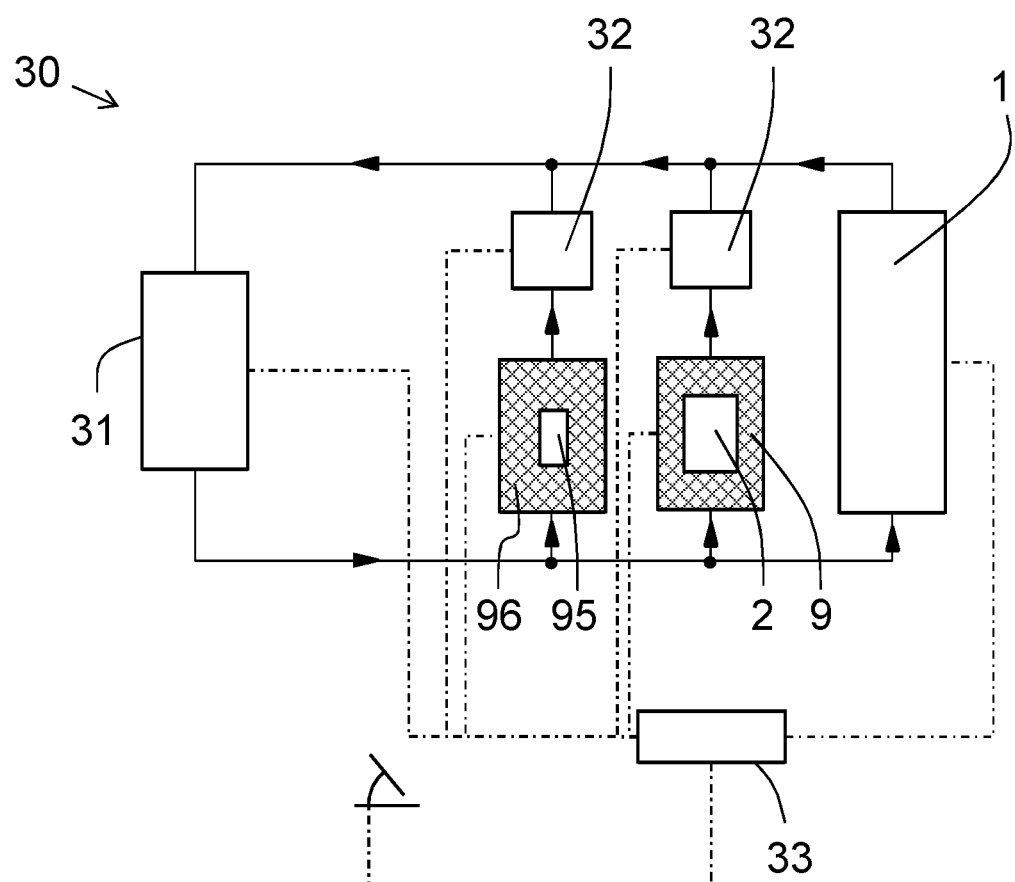

FIG. 10 schematically shows still a further example embodiment of the disclosure, wherein the electrical battery system further comprises a third battery pack 95, in addition to the first and second battery packs 1, 2 as described above. By having the third battery pack 95 have some other type of unique characteristic in terms of for example battery cell type, maximal 30-seconds discharge pulse current, nominal energy capacity per unit volume, thermal insulation level, nominal energy capacity, or the like, that differs from the characteristic of the first and second battery packs 1, 2, further improved overall performance of the electrical battery system in terms of a range of different relevant electrical battery system parameters may be accomplished, because each battery pack 1, 2, 95 may be designed to meet specific individual requirements, while taking less account of other requirements. Thereby, the design trade-offs that otherwise have to be made when designing a complete electrical battery system comprising a single section of battery cells of the same type may be overcome to a greater extent.

For example, the third battery pack 95 may have even smaller nominal energy capacity than the second battery pack 2 but an even better thermal insulation for enabling even further stand-time of the vehicle drive train without having to use significant amount of energy from the electrical battery system 3 for keeping the temperature of the third battery pack 95 above a minimum acceptable level required for being able to supply sufficient output power and store sufficient regeneration power directly upon cold start, and wherein the temperature of the second battery pack 2 upon cold start is higher than the temperature of the first battery pack 1.

Many other configurations are possible depending on modularity and what type of parameters the specific vehicle drive train shall be optimized for. For example, the third battery pack 95 may be identical with the second battery pack 2. Still more alternatively, the electrical battery system 3 may even comprise four, five or even more individual battery packs.

The term battery pack herein refers to an array of battery cells that are electrically connected with an unique and separate set of battery terminal connectors, such that the battery cells of each pack can supply and receive electrical charge independently of battery cells of other battery packs. Hence, a set of battery packs may be physically separate units or form sections of a single large battery casing.

As disclosed above, the battery cells 22 of the second battery pack 2 are better thermally insulated than the battery cells 21 of the first battery pack 1. Thereby, the operating temperature of the battery cells 22 of the second battery pack 2 generally decreases slower than the operating temperature of the battery cells 21 of the first battery pack 1 upon vehicle shut-down, for example in connection with vehicle parking at low ambient temperature. As a result, the battery cells 22 of the second battery pack 2 may still have a sufficient operating temperature at a substantially later vehicle startup for enabling more or less maximal acceleration and regeneration performance directly upon vehicle cold start.

Figure 11:
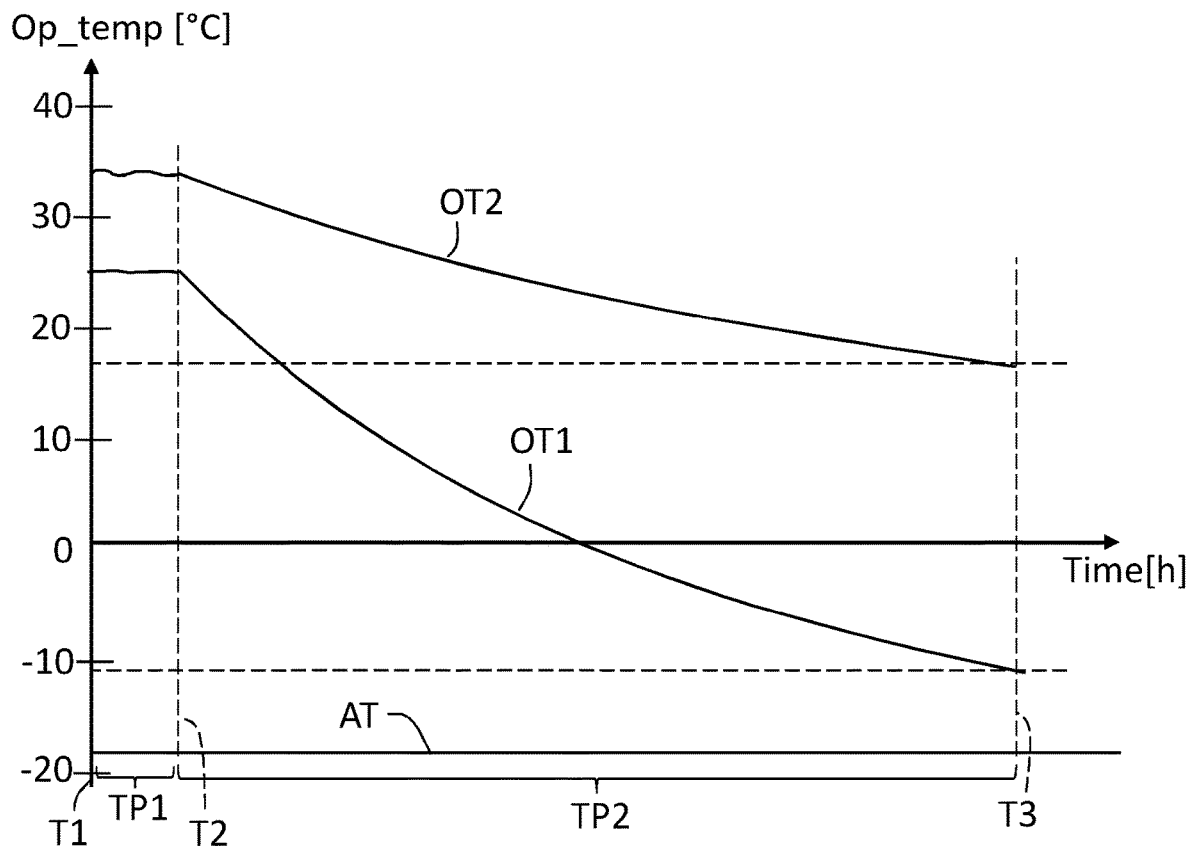
Figure 12:
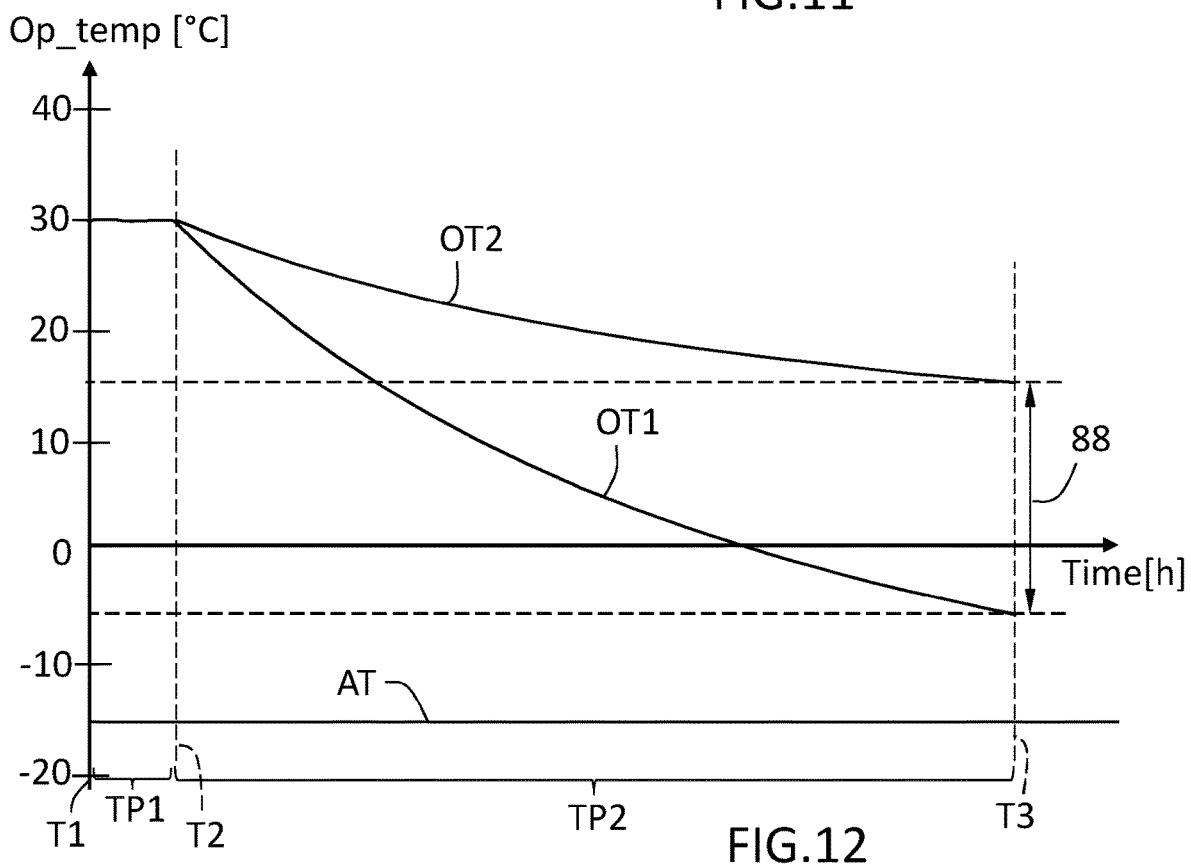

One effect of the differentiated thermal insulation of the first and second battery packs 1, 2 is illustrated in FIGS. 11 and 12, which show two different examples of an operating temperature chilldown sequence of the of the first and second battery packs 1, 2 over time.

Specifically, FIG. 11 schematically illustrates a first chilldown sequence of the operating temperature of the battery cells 21, 22 of a first and second battery pack 1, 2 according to an example embodiment of the electrical battery system 3, wherein the diagram shows operating temperature (Op_temp) in degree Celsius (° C.) along the vertical axis and the time in hours (h) along the horizontal axis. The vehicle ambient temperature AT, i.e. outside temperature, is for simplicity assumed to be constant −18° C.

During a first time period TP1 between time point T1 to T2 the vehicle is being driven by a user and electrical power is supplied from/to the first and second battery packs 1, 2 for vehicle propulsion and/or vehicle energy regeneration. Due to the different types of battery cells of the first and second battery packs 1, 2, i.e. wherein the cells of the first battery pack has higher nominal energy capacity per unit volume and the cells of the second battery pack withstands a larger maximal 30-seconds discharge pulse current, and the different use of said battery cells wherein the cells of the second battery pack is used for removing high power peaks from the energy optimized cells of the first battery pack, the operating temperature of the cells of the second battery pack 2 may be higher than the operating temperature of the cells of the first battery pack 1, especially during short-range city driving with a lot of start/stop due to for example traffic lights, traffic jams, etc.

For example, as illustrated in the non-limiting example embodiment of FIG. 11, the operating temperature OT1 of the first battery pack 1 may during the time period TP1 lie about 25° C. and the operating temperature OP2 of the second battery pack 2 may during the time period TP1 lie about 35° C.

At time point T2 the vehicle is stopped and no further heating of the battery cells of the first and second battery packs 1, 2 is provided. Consequently, the battery cells 21, 22 start to cool down upon heat transfer from the battery cells 21, 22 to the surroundings. Although not showed in FIG. 11, the operating temperature OT1, OT2 of the first and second battery packs 1, 2 will finally arrive at the ambient temperature AT.

The specific chilldown sequence illustrated in FIG. 11 is interrupted at time point T3. Consequently, the chilldown sequence corresponds to a second time period TP2 that start at time point T2 and ends at time point T3, wherein time point T3 herein represents a vehicle cold start. The second time period TP2 may for example be about 12 hours and correspond to a parked vehicle overnight.

As shown in FIG. 11, the operating temperature OT1 of the first battery pack 1 may then have dropped down to about −11° C., such that both electrical supply capacity to the electrical propulsion motor and electrical charging capacity, for example upon vehicle braking regeneration, is significantly reduced or even entirely disallowed due to potential damage to the battery cells of the first battery pack 1. However, the operating temperature OT2 of the second battery pack 2 has only dropped down to about 18° C., such that full performance both in terms of electrical supply capacity and electrical charging capacity is still available. Consequently, during cold start, when the driver drives away with the vehicle after a 12 hours stillstand at −18° C. ambient temperature, the driver experience full electrical propulsion/regeneration performance from the start, without harmful use of cold battery pack(s), without need for heating of the battery pack(s) during parking, and without need to for spacious thick thermal insulation of the entire battery system.

FIG. 12 schematically illustrates a second chilldown sequence of the operating temperature of the battery cells 21, 22 of a first and second battery pack 1, 2 according to a further example embodiment of the electrical battery system 3. The vehicle ambient temperature AT is here assumed to be constant −15° C., and the operating temperature OT1 of the first battery pack 1 during the time period TP1 is here substantially equal to the operating temperature OP2 of the second battery pack 2, such as for example about 30° C. This may for example occur during more long distance driving with less start-stops and a more even power output, during which the second battery pack may be less used than during city-driving.

In such a scenario, the chilldown sequence, that corresponds to the second time period TP2 and may be about 12 hours, will result in a vehicle cold start having an operating temperature OT1 of the first battery pack 1 of about −5° C. and an operating temperature OT2 of the second battery pack 2 of about 15° C. Hence, also here is full performance available directly at cold start, both in terms of electrical supply capacity and electrical charging capacity, such that the driver experience full performance from the start.

The chilldown sequence of FIG. 12 thus illustrates an electrical battery system, wherein due to the better thermal insulation of the battery cells of the second battery pack 2 than the battery cells of the first battery pack 1, the operating temperature of the battery cells of the second battery pack 2 is 20° C. higher than the operating temperature of the battery cells of the first battery pack 1 after having:

heated the battery cells of the first and second battery packs 1, 2 until the operating temperature of the battery cells of the first and second battery packs 1, 2 reached 30° C., placed the electrical battery system at an ambient temp of −15° C., and waited for 12 hours.

Specifically, the 20° C. temperature difference in operating temperature OT1, OT2 between the battery cells of the first and second battery packs 1, 2 after 12 hours is shown by ref. sign 88 in FIG. 12.

The heating of the battery cells of the first and second battery packs 1, 2 until the operating temperature of the battery cells of the first and second battery packs 1, 2 reaches 30° C., for test purpose, may for example be performed by suitable intensity of repeated electrical charging-discharging cycle of the battery cells.

The two chilldown sequence examples described with reference to FIGS. 11 and 12 correspond of course merely to two example embodiments of the first and second battery packs 1, 2, of the electrical battery system and vehicle drive train, and the chilldown sequence may thus vary considerably from the illustrated examples, in terms of form, internal relationship, gradient, absolute numbers, etc.

The terms "operating temperature of a battery pack" and "operating temperature of the battery cells of a battery pack" herein refers to an average surface temperature of a set of battery cells more or less evenly distributed within the battery pack. For example, the surface temperature of about 0.5-5%, but typically not less than five, individual cells of all battery cells of the battery pack may be registered and subsequently averaged for determining a battery pack operating temperature. The surface temperature of an individual cell may be measured at a central area of a side wall of the cell.

The disclosure further relates to a method for controlling operation of a vehicle drive train 30 comprising an electrical battery system 3 having a first battery pack 1 and a second battery pack 2, wherein the battery cells of the second battery pack 2 are better thermally insulated than the battery cells of the first battery pack 1, an electric propulsion motor 31, a bidirectional DC/DC converter 32 connecting the second battery pack 2 with the electrical motor 31, and an electronic controller arrangement 33 for controlling the operation of the drive train 30. The method comprises the step of, upon detecting cold start of the vehicle drive train, using primarily the second battery pack for vehicle propulsion and/or vehicle energy regeneration.

As discussed above, this enables space and cost saving and significantly improved drive train performance upon cold start, as well as improved lifetime of the main part of the electrical battery system 3.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The invention claimed is:

1. An electrical battery system for a vehicle comprising a first battery pack and a second battery pack, wherein the first battery pack has a larger total nominal energy capacity than the second battery pack, wherein the first battery pack comprises an array of a first type of battery cells and the second battery pack comprises an array of a second type of battery cells, wherein the second type of battery cells withstands a larger maximal 30-seconds discharge pulse current than the first type of battery cells, wherein the first type of battery cells have a higher nominal energy capacity per unit volume than the second type of battery cells, and wherein the battery cells of the second battery pack are better thermally insulated than the battery cells of the first battery pack.

2. The electrical battery system according to claim 1, wherein a total volume of all battery cells in the second battery pack is less than 40%, specifically less than 25%, and more specifically less than 10% of a total volume of all battery cells in the first battery pack.

3. The electrical battery system according to claim 1, wherein the first battery pack has at least 5 times, specifically at least 10 times, and more specifically at least 20 times larger total nominal energy capacity than the second battery pack.

4. The electrical battery system according to claim 1, wherein the first battery pack is located in a first casing and the second battery pack is located in a second casing, and wherein a thermal heat transfer coefficient of the second casing is at least 50% lower, specifically at least 75% lower, and more specifically at least 90% lower, than a thermal heat transfer coefficient of the first casing.

5. The electrical battery system according to claim 1, wherein the second battery pack has a total nominal energy capacity in the range of 0.5-20 kWh, specifically in the range of 0.7-5 kWh, and more specifically in the range of 1-2 kWh.

6. The electrical battery system according to claim 1, wherein due to the better thermal insulation of the battery cells of the second battery pack than the battery cells of the first battery pack, an operating temperature of the battery cells of the second battery pack is at least 10° C. higher, specifically at least 20° C. higher, and more specifically at least 30° C. higher, than an operating temperature of the battery cells of the first battery pack after having:

heated the battery cells of the first and second battery packs until the operating temperature of the battery cells of the first and second battery packs reached 30° C., placed the electrical battery system at an ambient temp of −15° C., and waited for 12 hours.

7. A vehicle drive train comprising the electrical battery system according to claim 1 and further comprising an electric propulsion motor, a bidirectional DC/DC converter connecting the second battery pack with the electrical motor, and an electronic controller arrangement for controlling the operation of the DC/DC converter, wherein the electronic controller arrangement is configured to, upon cold start of the vehicle drive train, use primarily the second battery pack for vehicle propulsion and/or vehicle energy regeneration.

8. The vehicle drive train according to claim 7, wherein the electronic controller arrangement further is configured to, in a vehicle drive train propulsion operating mode and when the operating temperature of the first battery pack is above a determined minimum temperature level, use primarily the first battery pack for vehicle propulsion, and to cap electrical power supply from the first battery pack at a first power threshold level and supply requested additional electrical power from the second battery pack.

9. The vehicle drive train according to claim 7, wherein the electronic controller arrangement further is configured to, in a vehicle drive train regeneration operating mode and when the operating temperature of the first battery pack is above a determined minimum temperature level, use primarily the first battery pack for vehicle energy regeneration, and to cap regenerated electrical charging power to the first battery pack at a second power threshold level and supply the additional regenerated electrical charging power to the second battery pack.

10. The vehicle drive train according to claim 7, wherein the drive train further comprises a heating system configured for transferring heat generated in the electrical motor and/or the DC/DC converter to the first battery pack for heating the battery cells of the first battery pack.

11. The vehicle drive train according to claim 7, wherein the DC/DC converter is designed as a Buck-Boost converter, and wherein the electronic controller arrangement is configured to control the power share between the first and second battery packs by controlling the PWM duty-cycle of the Buck-Boost converter.

12. The vehicle drive train according to claim 11, wherein the electronic controller arrangement is configured to operate the Buck-stage of the Buck-Boost converter when supplying regenerated electrical charging power from the electrical propulsion motor to the second battery pack, and/or wherein the electronic controller arrangement is configured to operate the Boost-stage of the Buck-Boost converter when supplying electrical power from the second battery pack to the electrical propulsion motor.

13. A vehicle comprising the electrical battery system according to claim 1, wherein each of the first and second battery packs has an individual battery pack fastening system for immobilizing the first and second battery packs within the vehicle, and wherein the fastening system of the second battery pack is operable separately from the fastening system of the first battery pack, such that the second battery pack can be dismounted and/or replaced without having to dismount also the first battery pack.

* * * * *